United States Patent
Park et al.

(10) Patent No.: US 10,716,991 B2
(45) Date of Patent: Jul. 21, 2020

(54) VIRTUAL GOLF SIMULATION APPARATUS, METHOD OF REALIZING IMAGE FOR VIRTUAL GOLF, AND COMPUTING-DEVICE-READABLE RECORDING MEDIUM HAVING THE SAME RECORDED THEREIN

(71) Applicant: GOLFZON CO., LTD., Daejeon (KR)

(72) Inventors: Jung Ho Park, Seoul (KR); Min Yong Cho, Seoul (KR)

(73) Assignee: GOLFZON CO., LTD., Daejeon (KR)

( * ) Notice: Subject to any disclaimer, the term of this patent is extended or adjusted under 35 U.S.C. 154(b) by 0 days.

(21) Appl. No.: 16/085,589

(22) PCT Filed: Mar. 14, 2017

(86) PCT No.: PCT/KR2017/002746
§ 371 (c)(1),
(2) Date: Sep. 17, 2018

(87) PCT Pub. No.: WO2017/160058
PCT Pub. Date: Sep. 21, 2017

(65) Prior Publication Data
US 2019/0099655 A1  Apr. 4, 2019

(30) Foreign Application Priority Data
Mar. 17, 2016 (KR) .................. 10-2016-0032390

(51) Int. Cl.
*A63B 71/06* (2006.01)
*A63B 67/02* (2006.01)
(Continued)

(52) U.S. Cl.
CPC ............ *A63B 71/0622* (2013.01); *A63B 1/00* (2013.01); *A63B 24/00* (2013.01); *A63B 67/02* (2013.01); *A63B 69/3623* (2013.01); *A63B 69/3658* (2013.01); *A63B 71/04* (2013.01); *A63B 71/06* (2013.01); *G06F 3/147* (2013.01); *G06F 3/1423* (2013.01); *G06K 9/00* (2013.01); *A63B 2071/0638* (2013.01); *A63B 2220/80* (2013.01); *G06F 3/14* (2013.01); *G09G 2354/00* (2013.01)

(58) Field of Classification Search
CPC ....... A63B 71/0622; A63B 1/00; A63B 24/00; A63B 67/02; A63B 69/3623; A63B 69/3658; A63B 71/04; A63B 71/06; A63B 2071/0638; A63B 2220/80; G06K 9/00
See application file for complete search history.

(56) References Cited

U.S. PATENT DOCUMENTS

2012/0277036 A1   11/2012   Lee

FOREIGN PATENT DOCUMENTS

| JP | 1991-046376 U | 4/1991 |
| JP | 2004-334145 A | 11/2004 |

(Continued)

OTHER PUBLICATIONS

International Search Report for PCT/KR2017/002746 dated Jul. 11, 2017 from Korean Intellectual Property Office.

*Primary Examiner* — Werner G Garner
(74) *Attorney, Agent, or Firm* — Revolution IP, PLLC

(57) ABSTRACT

Disclosed herein are a virtual golf simulation apparatus and a method of realizing an image for virtual golf that are capable of realizing an image that provides greater realism to a user who plays golf using images realized on a front screen and on a floor screen in a user golf play space.

13 Claims, 9 Drawing Sheets

(51) Int. Cl.

*G06K 9/00* (2006.01)
*G06F 3/147* (2006.01)
*G06F 3/14* (2006.01)
*A63B 24/00* (2006.01)
*A63B 1/00* (2006.01)
*A63B 69/36* (2006.01)
*A63B 71/04* (2006.01)

(56) References Cited

FOREIGN PATENT DOCUMENTS

| KR | 10-0972825 B1 | 7/2010 |
|----|----|----|
| KR | 10-2010-0124899 A | 11/2010 |
| KR | 10-1019862 B1 | 3/2011 |
| KR | 10-2011-0125526 A | 11/2011 |
| KR | 10-2012-0036156 A | 4/2012 |
| KR | 10-2013-0057308 A | 5/2013 |

FIG. 9
(a)
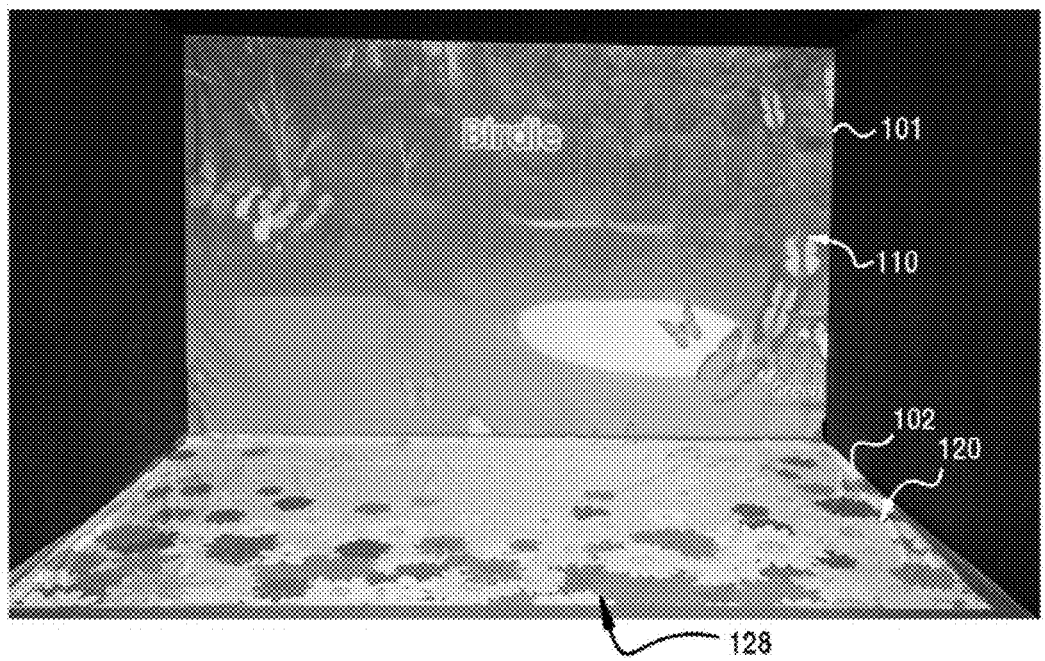
(b)

VIRTUAL GOLF SIMULATION APPARATUS, METHOD OF REALIZING IMAGE FOR VIRTUAL GOLF, AND COMPUTING-DEVICE-READABLE RECORDING MEDIUM HAVING THE SAME RECORDED THEREIN

TECHNICAL FIELD

The present invention relates to a virtual golf simulation apparatus and a method of realizing an image for virtual golf, and more particularly to a virtual golf simulation apparatus and a method of realizing an image for virtual golf that are capable of realizing an image simulating the trajectory of a golf ball hit by a user on a virtual golf course realized as an image through a screen based on the result of sensing the golf ball such that the user can play a round of golf or practice golf in a virtual space.

BACKGROUND ART

With the recent upsurge in the number of golfers, a so-called screen golf system, which enables a golfer to practice golf and to play a round of virtual golf using a virtual golf simulation system, has gained popularity.

The screen golf system may be realized by a virtual golf simulation apparatus that senses the velocity and direction of a golf ball that a golfer hits onto a screen installed indoors to display a virtual golf course and displays the progress of the golf ball on the screen. The technology of the screen golf system has evolved in order to enable a user to feel the same realism that the user feels when playing a round of golf on an actual golf course, which exceeds the level of enjoyment of a golf game that is simply played indoors.

However, a screen golf system including a general virtual golf simulation apparatus is limited in its ability to provide the same sense of realism that the user feels when the user plays a round of golf on an actual golf course because a virtual golf course and an image simulating the trajectory of a golf ball on the virtual golf course are realized only through a screen installed in front of the location at which the user hits the golf ball.

In order to overcome this limitation and to provide greater realism to users who enjoy screen golf, technology for realizing an image on a floor between the front screen and a shot plate as well as on the front screen has been proposed.

Korean Patent Application No. 10-2009-0043833 (entitled SCREEN GOLF SYSTEM USING STEREOSCOPIC IMAGE), Japanese Utility Model Application Publication No. 1991-046376 (entitled GOLF PLAY APPARATUS), and Japanese Patent Application Publication No. 2004-334145 (entitled METHOD OF THREE-DIMENSIONALLY CONFIGURING SCREEN TO DISPLAY SPACE) are disclosed as prior art documents related thereto.

However, the above-described prior art documents describe only outputting images to a front screen and to a floor screen. That is, images are output to the floor screen as well as the front screen, unlike the conventional case in which an image is output only to the front screen. When a user plays a virtual golf game, therefore, it is difficult to provide the same sense of realism that the user feels when the user plays a round of golf on an actual golf course.

DISCLOSURE

Technical Problem

It is an object of the present invention to provide a virtual golf simulation apparatus and a method of realizing an image for virtual golf that are capable of realizing an image that provides greater realism to a user who plays golf using images realized on a front screen and on a floor screen in a user golf play space.

Technical Solution

In accordance with an aspect of the present invention, the above and other objects can be accomplished by the provision of a virtual golf simulation apparatus including a sensing device for generating sensing information of a golf ball hit by a user, an image output device for outputting an image simulating a virtual golf course and a virtual ball on the virtual golf course to a front screen provided in front of the location at which the user hits the golf ball and to a floor screen provided on a floor between a shot plate, on which the user takes a golf swing, and the front screen, and a simulator including an image-processor for processing an image to be output by the image output device and a controller for performing a calculation in order to realize the simulation image based on the sensing information sensed by the sensing device, performing control such that the occurrence of a predetermined situation is sensed before the user takes a golf shot on the shot plate, performing control such that the image-processor processes an image in which an image for the front screen and an image for the floor screen are changed depending on a predetermined condition, and performing control such that the image is output through the image output device.

In accordance with another aspect of the present invention, there is provided a method of realizing an image for virtual golf in which images are output to a front screen provided in front of the location at which a user hits a golf ball and to a floor screen provided on a floor between a shot plate, on which the user takes a golf swing, and the front screen, such that an image of a virtual space for virtual golf played by the user is realized on the front screen and on the floor screen, the method including a sensing device, configured to generate sensing information of the golf ball moved according to a golf shot taken by the user, sensing the occurrence of a predetermined situation before the user takes the golf shot on the shot plate, and a controller performing control such that, in an image of a virtual golf course output to the front screen and to the floor screen, the image for the front screen is shifted and output to the floor screen.

In accordance with a further aspect of the present invention, there is provided a method of realizing an image for virtual golf in which images are output to a front screen provided in front of the location at which a user putts a golf ball and to a floor screen provided on a floor between a shot plate, on which the user putts, and the front screen, such that an image of a virtual green for putting of the user and a virtual ball is realized and output to the front screen and to the floor screen through an image output device, the method including a sensing device transmitting a result of sensing the golf ball to a controller, the controller generating a ball-ready indication indicating that the sensing device is ready to perform sensing according to hitting of the golf ball by the user based on the received information, and the controller performing control such that, when the ball-ready indication is generated, the image that is output to the front screen and to the floor screen is shifted from the position of the virtual ball to the position of the golf ball.

Advantageous Effects

A virtual golf simulation apparatus and a method of realizing an image for virtual golf according to the present invention have effects in that the virtual golf simulation apparatus, realizing images on a front screen and a floor screen in a user golf play space, changes the front screen image and the floor screen image when a specific situation occurs while a user plays golf using the front screen image and the floor screen image, whereby it is possible to provide the user who plays golf with greater realism and to provide the user who plays virtual golf with greater immersiveness or interest in a game.

DESCRIPTION OF DRAWINGS

FIGS. 4 to 9 are views showing examples of images realized according to the method of realizing the image for virtual golf shown in FIG. 3.

BEST MODE

A virtual golf simulation apparatus and a method of realizing an image for virtual golf according to the present invention will be described in more detail with reference to the accompanying drawings.

First, the construction of a virtual golf simulation apparatus according to an embodiment of the present invention will be described with reference to FIGS. 1 and 2.

Figure 1:
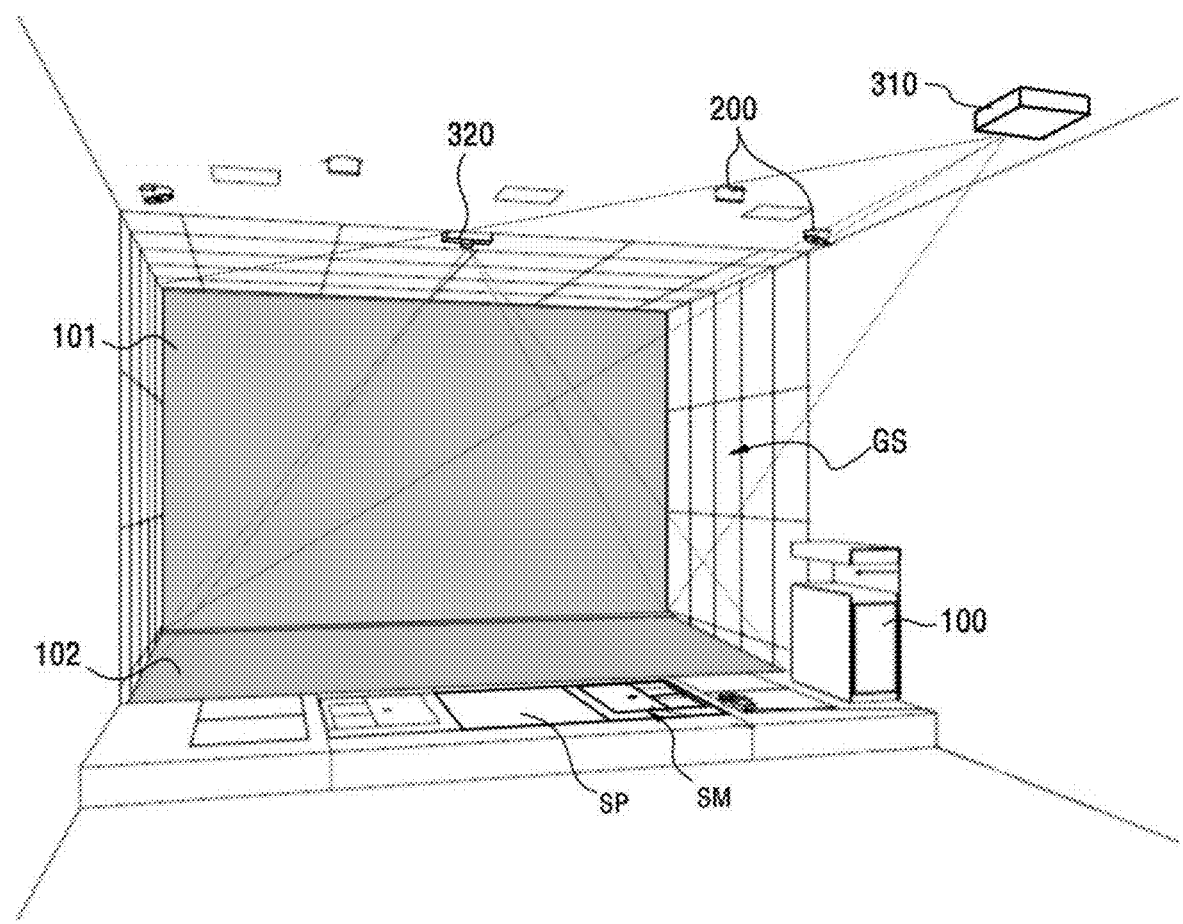
FIG. 1 is a view showing a screen golf system realized by a virtual golf simulation apparatus according to an embodiment of the present invention.
Figure 2:
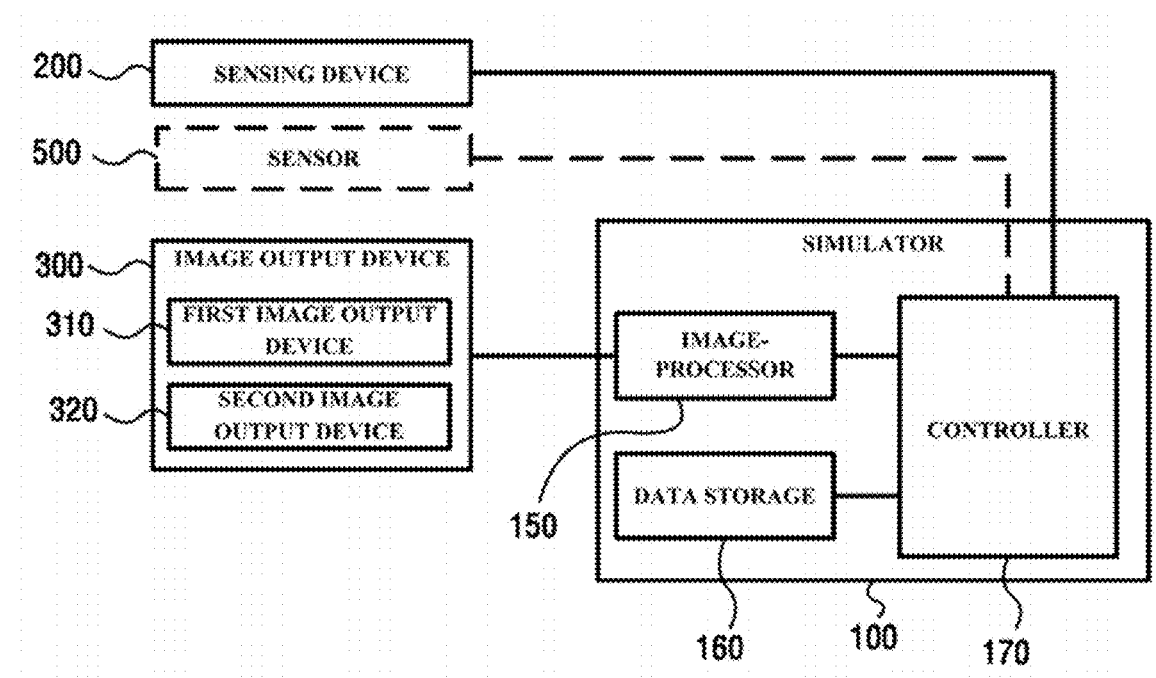
FIG. 2 is a block diagram showing the construction of the virtual golf simulation apparatus according to the embodiment of the present invention.

FIG. 1 is a view showing a screen golf system realized by a virtual golf simulation apparatus according to an embodiment of the present invention, and FIG. 2 is a block diagram showing the construction of the virtual golf simulation apparatus according to the embodiment of the present invention.

As shown in FIGS. 1 and 2, the virtual golf simulation apparatus according to the embodiment of the present invention may include a simulator 100, a sensing device 200, and an image output device 300. In some embodiments, the virtual golf simulation apparatus may further include a separate sensor 500.

As shown in FIG. 1, the virtual golf simulation apparatus according to the embodiment of the present invention is configured such that a shot plate SP, on which a user takes a golf swing, a front screen 101, which is installed in front of a shot mat SM, on which a golf ball to be hit by the user using a golf club is placed, and a floor screen 102, which is installed on a floor between the front screen 101 and the shot plate SP, are provided in a golf play space GS having a predetermined size, whereby the user may play virtual golf using the screen golf system.

The image output device 300 may include a single image output device, which simultaneously outputs images to the front screen 101 and to the floor screen 102. Specifically, the image output device 300 may be configured such that an image to be output to the front screen 101 and an image to be output to the floor screen 102 are simultaneously projected by the single image output device. As shown in FIGS. 1 and 2, the image output device 300 may include a first image output device 310 for outputting an image to the front screen 101 and a second image output device 320 for outputting an image to the floor screen 102.

As shown in FIGS. 1 and 2, the first image output device 310 outputs an image to the front screen 101 while the second image output device 320 outputs an image to the floor screen 102 such that the image output to the front screen 101 and the image output to the floor screen 102 constitute a single image for virtual golf.

Here, the horizontal lengths of the front screen 101 and the floor screen 102 may be substantially equal to each other, and the vertical lengths of the front screen 101 and the floor screen 102 may be substantially equal to each other. Alternatively, at least the horizontal lengths of the front screen 101 and the floor screen 102 may be equal to each other.

That is, the front screen 101 and the floor screen 102 may be connected to each other in order to constitute a single screen, or may be provided separately. Even in the case in which the front screen 101 and the floor screen 102 are provided separately, images may be connected to each other in order to constitute a single image. For this reason, at least the horizontal lengths of the front screen 101 and the floor screen 102 may be equal to each other.

An image that is processed by the simulator 100 may be divided into two images. One of the divided images may be transmitted to the first image output device 310, which may output the image. The other of the divided images may be transmitted to the second image output device 320, which may output the image.

As shown in FIG. 2, the simulator 100 includes an image-processor 150, a data storage 160, and a controller 170. Basically, the image-processing device generates an image of a virtual golf course, on which the user plays golf, and outputs the generated image to the respective screens. In addition, the image-processing device generates a simulation image, in which a virtual ball moves, based on information about the motion of a golf ball sensed and calculated by the sensing device 200 when the user hits the golf ball on the shot plate SP, and outputs the generated simulation image to the respective screens.

The data storage 160 may be configured to store various kinds of information about the operation of the virtual golf simulation apparatus according to the embodiment of the present invention and to store image data necessary to realize a virtual golf course image.

Alternatively, data necessary to realize a virtual golf course image may be stored in a database of a server (not shown), a piece of the data necessary to realize the virtual golf course image selected by the user may be extracted from the database of the server and may then be transmitted to the simulator 100, and the transmitted data may be temporarily stored in the data storage 160.

The image-processor 150 is configured to process all images related to virtual golf simulation, such as an image of a virtual golf course, an image of the motion of a ball, and an image for menu selection, as data received from the data storage 150 or from the server (not shown).

The controller 170 is configured to perform various calculations for virtual golf simulation and control of the respective elements.

In particular, the controller 170 controls the image-processor 150 such that an image that is output through the respective image output devices 310 and 320, such as an image of a virtual golf course or a simulation image in which a virtual ball is moved, is generated by the image-processor 150 and such that the generated image is divided into a first image, which is output through the first image output device 310, and a second image, which is output through the second image output device 320.

After the image is processed by the image-processor 150, the first image or an image obtained by performing predetermined image processing on the first image is transmitted to the first image output device 310, which outputs the same to the front screen 101, and the second image or an image obtained by processing the second image is transmitted to the second image output device 320, which outputs the same to the floor screen 102.

Meanwhile, the sensing device 200 is a device that senses the motion of at least one of a golf club or a golf ball when the user takes a golf swing.

The sensing device 200 may be realized in any of various forms. The sensing device may be an infrared-sensor-type sensing device, which emits infrared rays, receives the infrared rays reflected by a golf club head or a ball that is moved when the user hits the ball, and analyzes the reflected infrared rays in order to sense the motion of the golf club head or the ball, a laser-sensor-type sensing device, which emits laser beams and then senses and analyzes the laser beams blocked by a golf club head or a ball that is moved in order to sense the motion of the golf club head or the ball, or an image-sensor-type sensing device, which collects and analyzes images of a ball hit as the result of the user taking a golf swing using a golf club in order to sense the motion of the ball.

In the case in which the sensing device 200 is an image-sensor-type sensing device, it is possible to sense a greater number of objects than when using other types of sensing devices. For example, the sensing device may acquire an image of the shot plate in order to sense the position on the shot mat SM on which a golf ball is placed, and may sense the motion of the golf ball placed on the shot mat in order to sense whether the user is ready to hit the golf ball. Furthermore, the sensing device may also sense the motion of the user in order to obtain information about whether the user is ready to hit the golf ball based on information about whether the user stands on the shot plate or whether the user remains stationary for a predetermined amount of time.

Of course, it is possible to sense the motion of the user using the separate sensor 500, for example, a depth camera device.

Hereinafter, a method of realizing an image for virtual golf used in the virtual golf simulation apparatus according to the embodiment of the present invention will be described in more detail with reference to FIGS. 3 to 8.

Figure 3:
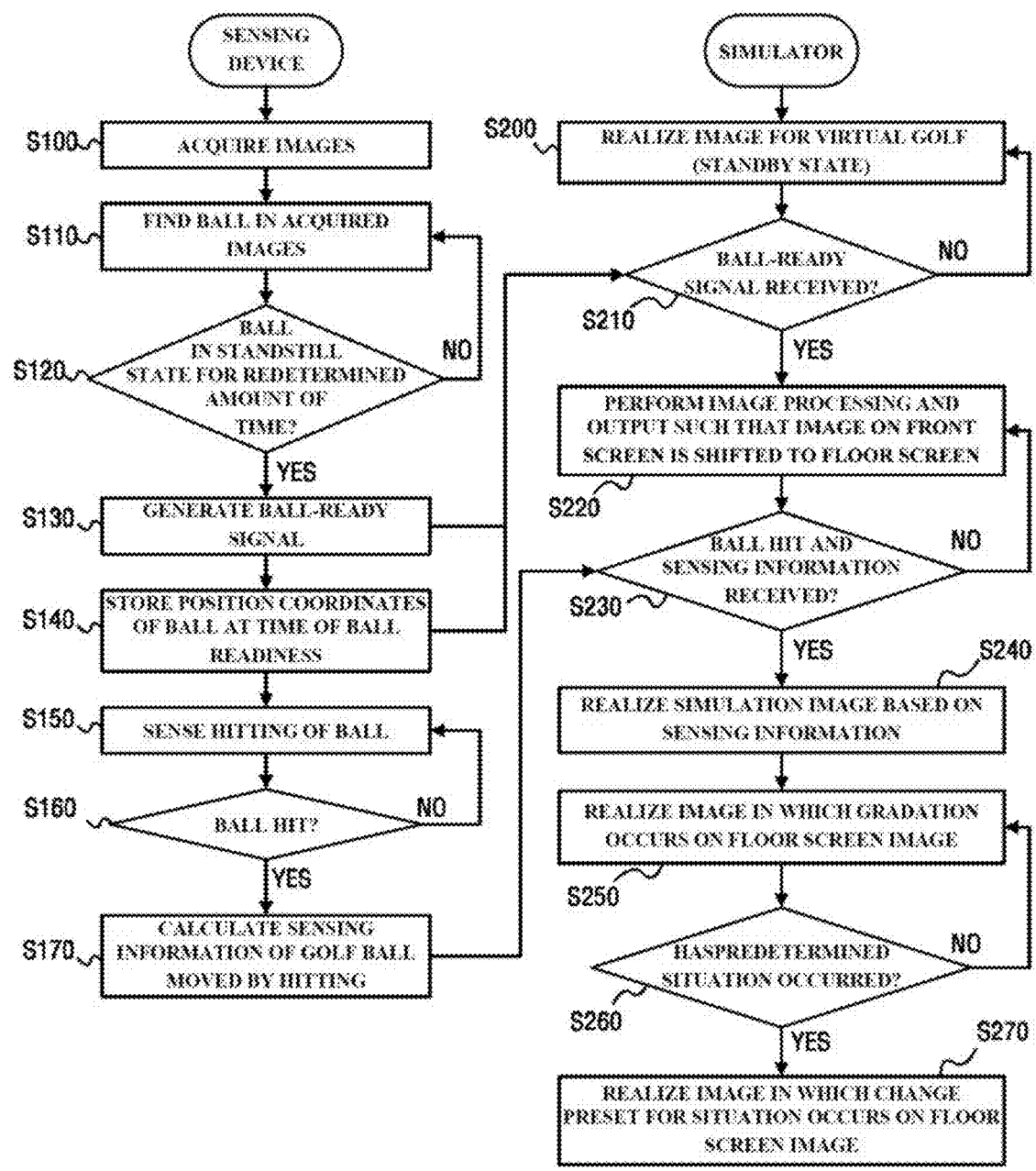
FIG. 3 is a flowchart showing a method of realizing an image for virtual golf according to an embodiment of the present invention.

FIG. 3 is a flowchart showing a method of realizing an image for virtual golf used in the virtual golf simulation apparatus according to the embodiment of the present invention, and FIGS. 4 to 8 are detailed views showing examples of images realized according to the flowchart shown in FIG. 3.

Referring first to FIG. 3, the simulator is in a standby state while realizing an image for virtual golf, for example, an image for a virtual golf course, on which a user plays virtual golf (S200), and the user stands on the shot plate in order to take a golf shot.

At this time, the sensing device continuously acquires images corresponding to a predetermined angle of view including the shot plate (S100), and analyzes the acquired images in order to find a ball corresponding to a golf ball placed on the shot mat in the images (a ball-finding process) (S110).

The ball-finding process may be a process of performing differential image processing and binarization in the images and determining an object satisfying conditions, such as a predetermined size, an aspect ratio, and brightness, as a ball, or may be a process of comparing an object in the acquired images with a template of a predefined ball in order to find a ball based on the determination of similarity.

In the case in which the sensing device succeeds in finding the ball, continuously acquired images may be analyzed in order to determine whether the found ball is in a standstill state for a predetermined amount of time (S120). Upon determining that the ball is in a standstill state for a predetermined amount of time, a ball-ready signal indicating that the sensing device is ready to obtain the sensing information according to the hitting of the golf ball by the user is generated (S130).

When the ball-ready signal is generated, the controller of the simulator generates a ball-ready indication such that the procedure advances to the next step in the standby state (an image and voice corresponding to the ball-ready indication may also be generated on an image).

When the ball-ready signal is generated, the sensing device stores the position coordinates of the ball at the time of ball readiness and transmits the same to the simulator (S140).

Upon receiving the ball-ready signal from the sensing device in the standby state (S210), the controller of the simulator generates the ball-ready indication and controls the image-processor such that the image for the front screen is shifted to the floor screen and the shifted image is transmitted to the image output device, which outputs the shifted image.

Figure 4:
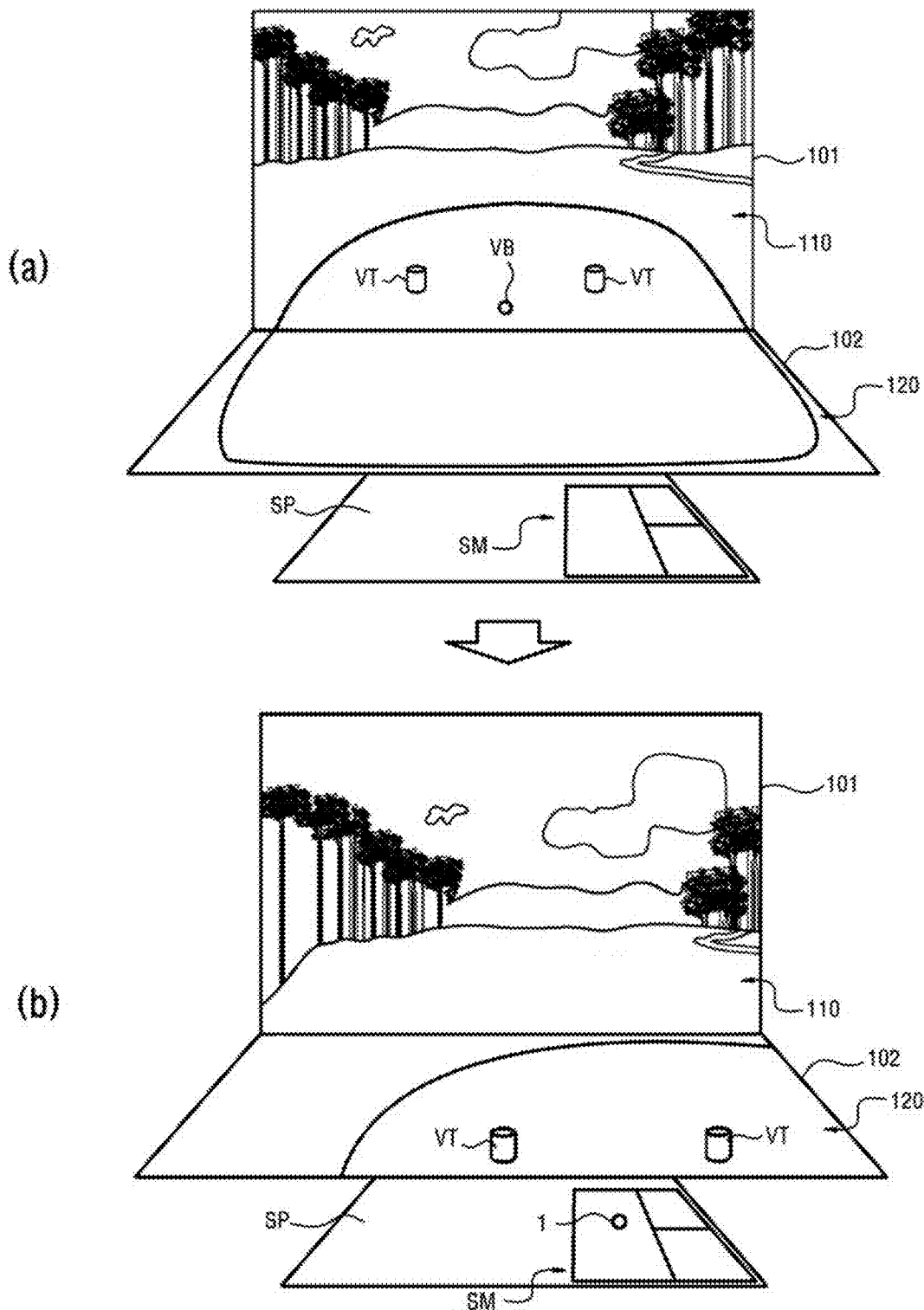
Figure 5:
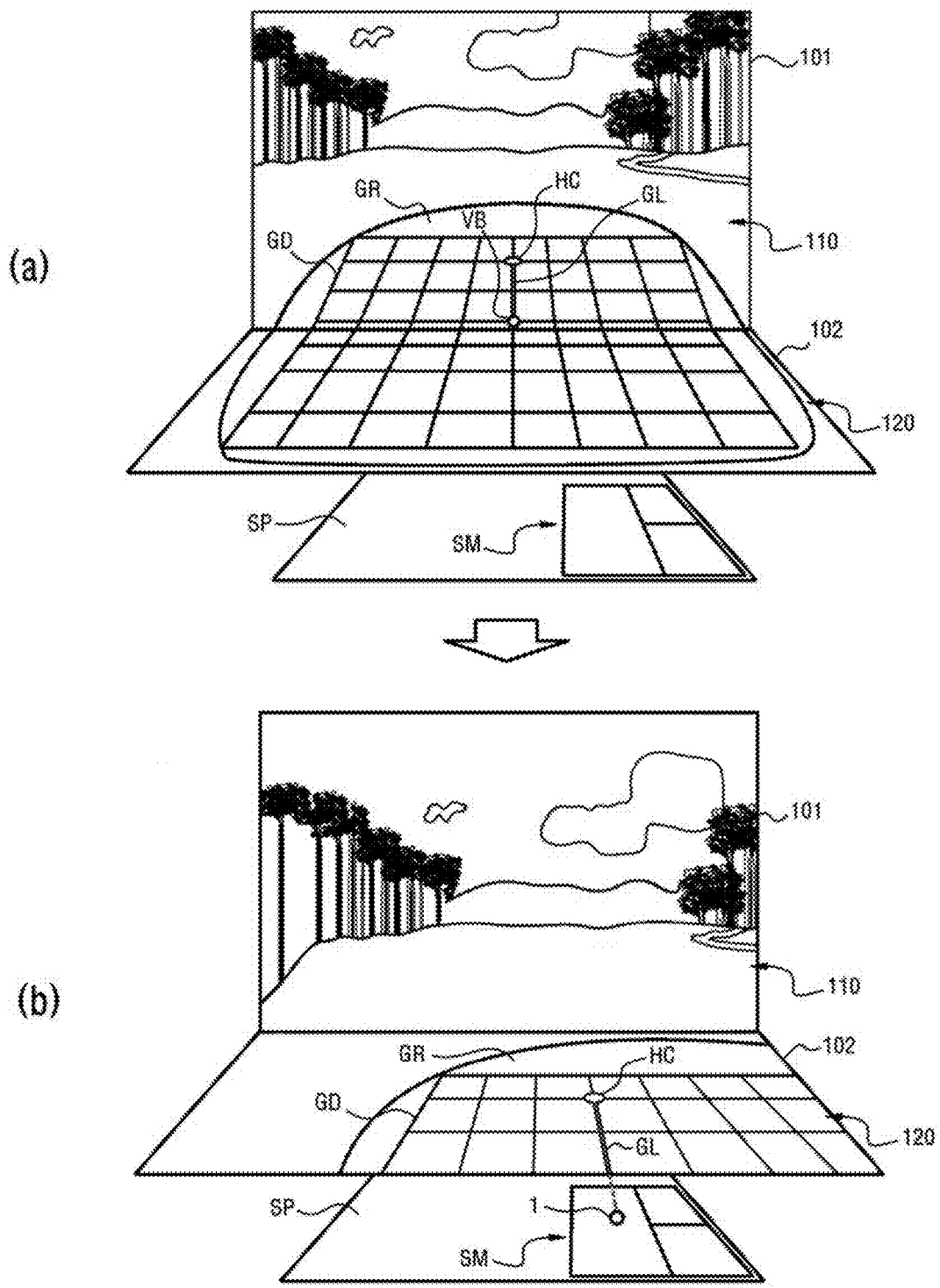

Concrete examples thereof are shown in FIGS. 4 and 5.

FIG. 4 shows the case in which the user takes a tee shot on a virtual golf course, and FIG. 5 shows the case in which the user putts on a virtual green.

As shown in FIG. 4(a), an image of a tee marker VT and a virtual ball VB is realized on a front screen image 110, which is output to the front screen 101, and an image of a floor at the rear of the tee marker VT is realized on a floor screen image 120, which is output to the floor screen 102, before the ball-ready indication is generated, i.e. in a standby state.

At this time, when the ball-ready indication is generated, as shown in FIG. 4(b), the front screen image 110 is shifted to the floor screen 102, with the result that an image of the tee marker VT is realized on the floor screen image 120.

When the image is shifted, as described above, the virtual ball VB disappears. In the case in which the image is shifted from the state shown in FIG. 4(a) to the state shown in FIG. 4(b), the position of the virtual ball VB becomes the position of an actual golf ball 1.

That is, information about the position coordinates of the golf ball sensed by the sensing device at the time of ball readiness is transmitted to the controller of the simulator, which performs control to shift the image by the distance from the position of the virtual ball VB in a virtual space to the position of the actual golf ball, with the result that the virtual ball VB disappears from the image.

In the realization of the image as described above, the state in which the user stands behind a tee marker on a specific hole of an actual golf course and then moves to the position of the tee marker in order to take a golf shot, i.e. the state in which the user is ready to hit a golf ball, is realized on the front screen image and the floor screen image.

The front screen image may be shifted to the floor screen as follows. As described above, the distance from the position of the virtual ball to the position of a golf ball placed on the shot mat may be calculated, and the front screen image may be shifted to the floor screen by the calculated distance. Alternatively, the distance by which the image is shifted may be predetermined, and the image may be shifted by the predetermined distance.

When the image is shifted, the controller may calculate the shift distance and the shift direction from the position of the virtual ball to the position of an actual golf ball, and may control the image-processor such that the image is shifted according to the calculated shift distance and shift direction.

In the above example, the image is shifted at the time of ball readiness. However, the method of realizing the image for virtual golf according to the present invention is not limited thereto. The sensing device or the separate sensor may sense whether the user takes an address posture on the shot plate (may sense the motion of the user in the image) in order to determine whether the user is ready to hit a golf ball, and, upon determining that the user is ready to hit the golf ball, the image may be shifted. Alternatively, the sensing device or the separate sensor may sense the entry of the user into the shot plate such that the image is shifted at the time of the entry of the user into the shot plate.

Meanwhile, referring to FIG. 5, which shows the case in which the user putts on a virtual green GR. Before the ball-ready indication is generated, as shown in FIG. 5(a), an image of a virtual green GR and a grid GD indicating information about the topography of the green is realized over the front screen image 110 and the floor screen image 120, and a hole cup HC appears on the front screen image 110.

In addition, as shown in FIG. 5(a), a virtual ball VB appears on the front screen image 110 so as to face the hole cup HC, and a guide line GL may be displayed from the virtual ball VB to the hole cup HC.

At this time, when a golf ball 1 is placed on the shot mat SM and a ball-ready indication is generated through the sensing of the sensing device, the controller of the simulator calculates the shift distance and the shift direction from the position of the virtual ball VB to the position of the golf ball 1 placed on the shot mat SM, and performs control such that the image is shifted to the state shown in FIG. 5(b) according to the calculated shift distance and shift direction.

That is, objects that appear on the front screen image 110 are moved to the floor screen image 120 through the above-described shift.

When the ball-ready indication is generated, therefore, the position of the virtual ball becomes the position of an actual golf ball 1 on the shot mat SM, and an image around the golf ball (the hole cup HC) is realized based on the position. As shown in FIG. 5(b), the hole cup may be realized on the floor screen image 120.

The guide line GL, which guides the direction from the virtual ball VB to the hole cup HC, may be directed from the position of the actual golf ball 1 to the hole cup HC on the floor screen image 120 according to the shift. In FIG. 5(b), the guide line GL is directed from the position of the golf ball 1 to the hole cup HC on the floor screen image 120. The dotted portion of the guide line is provided in order to show that the guide line GL is displayed based on the position of the actual golf ball 1, and is not actually displayed.

Figure 7:
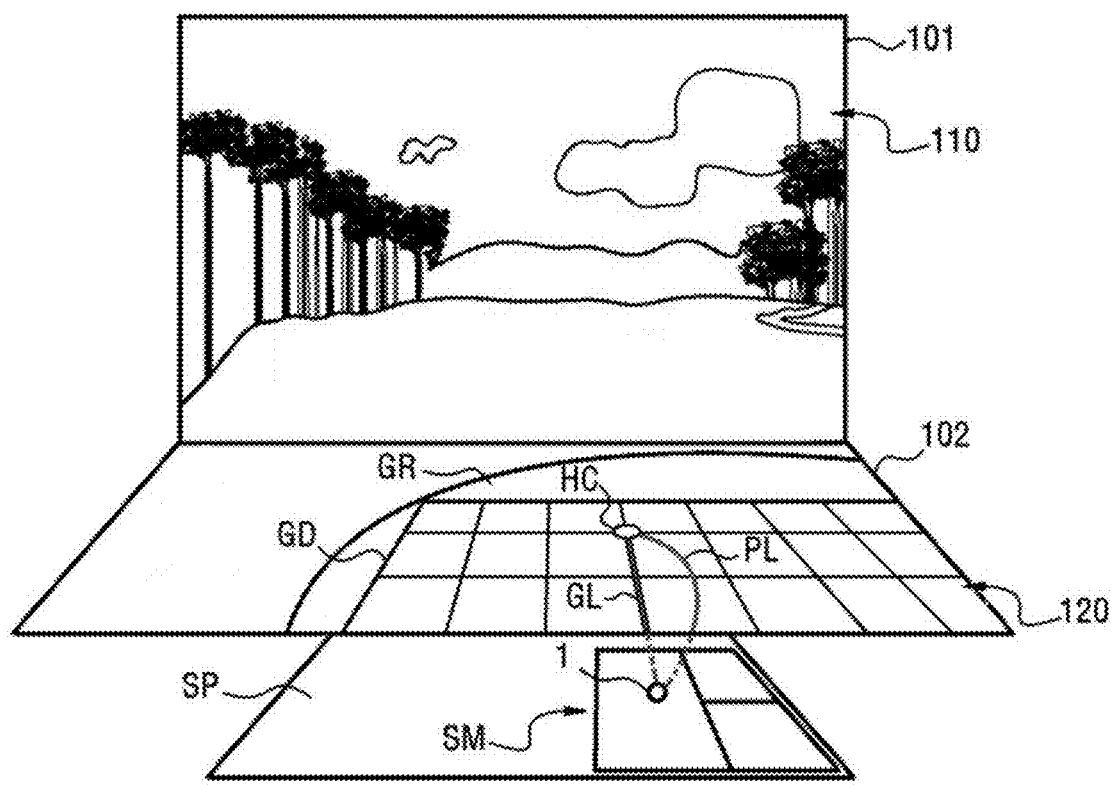

Depending on the circumstances, the user may wish the simulator to present the putting direction. According to the request of the user, the controller of the simulator may recognize information about the topography between the virtual ball VB and the hole cup HC in order to present the putting trajectory in the case in which a golf ball is preferably putted. After the image is shifted according to the ball-ready indication, as shown in FIG. 5(b), a putting guide line PL indicating the putting trajectory toward the hole cup HC on the floor screen image 120 based on the position of the actual golf ball 1 may be displayed, as shown in FIG. 7. Here, the dotted line is not actually displayed, but is provided in order to show that the putting guide line PL is displayed based on the position of the actual golf ball 1.

When the ball-ready indication is generated, as described above, the image is shifted such that the virtual ball and the topography and guiding means around the virtual ball on the front screen image are realized on the floor screen image based on the position of the actual golf ball. Consequently, the state in which the user stands behind a ball before hitting the ball and then moves to the position at which the ball is placed in order to hit the ball may be realized through the image shift.

Figure 6:
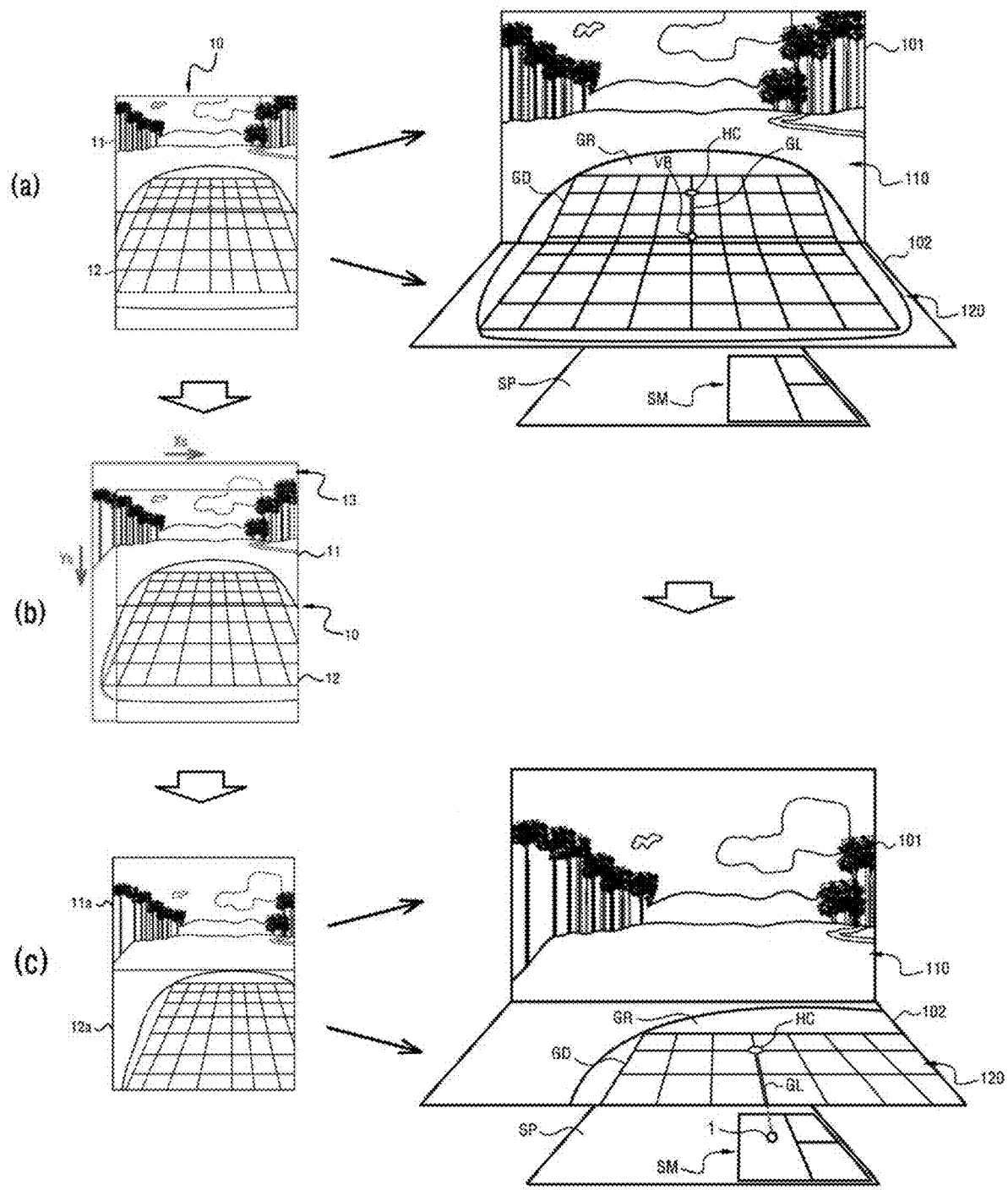

Hereinafter, an example in which the image is shifted according to ball readiness, as shown in FIGS. 4 and 5, will be described in more detail with reference to FIG. 6.

FIG. 6(a) shows the case in which the front screen image and the floor screen image shown in FIG. 5(a) are output through an image generated by the image-processor, FIG. 6(b) shows the case in which the image is shifted by the image-processor, and FIG. 6(c) shows the case in which the image shifted by the image-processor is realized through the front screen image and the floor screen image shown in FIG. 5(b).

As shown in FIG. 6(a), the image-processor of the simulator of the virtual golf simulation apparatus according to the embodiment of the present invention generates an entire image 10 to be output to the front screen 101 and to the floor screen 102, and the controller divides the generated image into a part 11 to be output to the front screen (hereinafter, referred to as a "first image") and a part 12 to be output to the floor screen (hereinafter, referred to as a "second image").

The controller transmits the first image 11 or an image obtained by performing predetermined image processing on the first image 11 to the first image output device such that the image is output to the front screen 101 so as to realize a front screen image 110, and transmits the second image 12 or an image obtained by performing predetermined image processing on the second image 12 to the second image output device such that the floor portion of the second image 12 is output to the floor screen 102 through the second image output device so as to realize a floor screen image 120, since the entire image 10 is an image of a three-dimensional space.

When ball readiness is accomplished, as shown in FIG. 6(b), the image-processor generates a new image part 13, which is shifted in at least one of an Xs direction and a Ys direction.

At this time, the distance Xs and Ys by which the image is shifted may be a value preset by the controller or a value calculated as the distance from the position of the virtual ball to the position of the golf ball 1 on the shot mat SM.

That is, on the assumption that the position of the golf ball 1 is located at the enlarged portion of the image realized through the front screen image 110 and the floor screen image 120, the distance from the position coordinates of the virtual ball on the image to the position coordinates of the golf ball 1 may be calculated, and the image may be shifted by Xs and Ys, which denote the coordinates of the calculated distance.

For example, in the case in which the position coordinates of the virtual ball on the image are (x1, y1) based on a predetermined position and the position coordinates of the actual golf ball 1 are (x2, y2) in the same state, the shift distance Xs may be calculated as x2−x1 or x1−x2, and the shift distance Ys may be calculated as y2−y1 or y1−y2.

Here, (Xs, Ys) may be {(x2−x1), (y2−y1)} or {(x1−x2), (y1−y2)} depending on the shift direction.

The entire image 10 is shifted according to Xs and Ys preset as described above or Xs and Ys calculated as described above. As a result, the first image is changed to a part indicated by 11a (hereinafter, referred to as a "shifted first image"), and the second image is changed to a part indicated by 12a (hereinafter, referred to as a "shifted second image"), as shown in FIG. 6(c).

As shown in FIG. 6(c), therefore, the shifted first image 11a or an image obtained by performing predetermined image processing on the shifted first image is output to the front screen 101 through the first image output device in order to realize a front screen image 110, and the shifted second image 12a or an image obtained by performing predetermined image processing on the shifted second image is output to the floor screen 102 through the second image output device in order to realize a floor screen image 120.

FIGS. 4 and 5 show the realization of the image through the image shift in the case in which the user takes the tee shot on the virtual golf course and in the case in which the user putts, respectively. However, the method of realizing the image for virtual golf according to the present invention is not limited thereto. The method of realizing the image for virtual golf according to the present invention may be equally applied to all golf shots taken on the virtual golf course, such as an iron shot or an approach shot.

Referring back to FIG. 3, in the case in which ball readiness is accomplished, as described above, and the image shift is performed based on the position of the actual golf ball, which means that the user is ready to hit the golf ball, the sensing device starts to perform a ball-hitting sensing process (S150).

The ball-hitting sensing process of the sensing device may be a process of determining whether the ball is present at the position of the ball in the image at the time of ball readiness in order to determine whether the golf ball has been hit through analysis of the acquired image (analysis based on differential image processing and binarization).

In the case in which the hitting of the ball has been sensed through the ball-hitting sensing process (S160), the sensing device calculates sensing information of the golf ball that is moved by the hitting, for example, parameters of the ball, such as the speed, the direction angle, the height angle, and the spin of the ball, and transmits the calculated sensing information to the simulator (S170).

In the case in which the hitting of the ball has been performed, the simulator receives the sensing information from the sensing device (S230), and realizes a simulation image, in which the virtual ball is moved by the hitting, on the image of the virtual golf course based on the sensing information (S240).

At this time, the simulation image is displayed over the front screen image and the floor screen image.

As the result of the realization of the simulation image, the virtual ball may land on the fairway of the virtual golf course, may land on the virtual green, or may enter the hole cup, based on which a par or birdie score may be recorded.

In the case in which a predetermined specific situation occurs while the virtual golf game based on the realization of the simulation image of the virtual golf course is being played, as described above, the virtual golf simulation apparatus according to the present invention may realize an image in which a change preset for the specific situation occurs in the floor screen image, whereby it is possible for the user to play the golf game with greater interest and immersiveness.

For example, in the case in which the simulator is in the standby state (S200), in the case in which the simulation image, in which the virtual ball is moved according to the hitting of the golf ball, is realized (S240), or in the case in which the ball drops to the ground and stops, an image in which gradation occurs on the floor screen image may be realized, whereby it is possible to improve the user's interest and immersiveness in the game.

This will be described with reference to FIG. 8. FIG. 8(a) shows a change on the floor screen image in the case in which the simulator is in the standby state, FIG. 8(b) shows a change on the floor screen image in the case in which the simulation image, in which the virtual ball is moved, is realized, and FIG. 8(c) shows a change on the floor screen image in the case in which the virtual ball drops to the ground and stops. FIGS. 8(d), 8(e), and 8(f) respectively show the changed portions on the floor screen image extracted from FIGS. 8(a), 8(b), and 8(c).

A change on the floor screen image 120 in FIGS. 8(a) and 8(d) will be designated as a first effect 122, a change on the floor screen image 120 in FIGS. 8(b) and 8(e) will be designated as a second effect 123, and a change on the floor screen image 120 in FIGS. 8(c) and 8(f) will be designated as a third effect 124.

In the standby state, the user may be distracted by the glare of the floor screen image, whereby it may be difficult to take a golf shot. Consequently, an image may be realized such that a first effect 122 for darkening the portion of the floor screen image 120 that is close to the position of the user appears.

In the case in which the golf ball is hit and the simulation image, in which the virtual ball is moved, is realized on the image, an image may be realized such that a second effect 123 for forming gradation from the periphery of the floor screen image 120 toward a portion (preferably, the central part) of the side of the floor screen that is connected to the front screen appears.

The second effect 123 is achieved such that gradation occurs in the direction indicated by the dotted arrows, as shown in FIGS. 8(b) and 8(e), whereby it is possible for the user who sees the virtual ball moving on the image to be more greatly immersed into the image due to a so-called "IllumiRoom" effect.

In the case in which the simulated virtual ball drops to the ground, rolls along the ground, and then stops, the gradation due to the second effect 123 is terminated due to the third effect 124. The immersiveness of the user is further improved by the second effect 123 and the third effect 124.

The first to third effects (hereinafter, referred to as "special effects") are an example of the realization of a special image that can be represented through the floor screen image. In addition to the special effects, such as gradation, various other special effects may be prepared in advance, and the user may select at least one of the prepared special effects before playing a golf game such that the special effect selected by the user is represented through the floor screen image while the user plays the golf game.

Referring back to FIG. 3, various situations may occur depending on the result of realization of the simulation image, in which the virtual ball is moved according to the hitting of the golf ball, as described above.

For example, the virtual ball may land in the rough, may fall into a hazard, may land on the green, or may enter the hole cup, based on which a birdie or eagle score may be recorded.

The virtual golf simulation apparatus according to the embodiment of the present invention may predetermine the special situations as illustrated above, and may preset a special change on the image suitable for each of the predetermined situations.

The simulator may determine whether one of the predetermine situations has occurred as the result of progression of the simulation image in which the virtual ball is moved (S260).

Upon determining that one of the predetermined situations has occurred as the result of progression of the simulation image in which the virtual ball is moved, the simulator realizes an image in which a change preset for the situation occurs on the floor screen image (S270).

For example, in the case in which a birdie score is recorded as the result of progression of the simulation image in which the virtual ball is moved, as shown in FIGS. 9(*a*) and 9(*b*), a special image 128 preset to celebrate the birdie score may be presented through the floor screen image 120, whereby it is possible to further engage the interest of the user.

Figure 8:
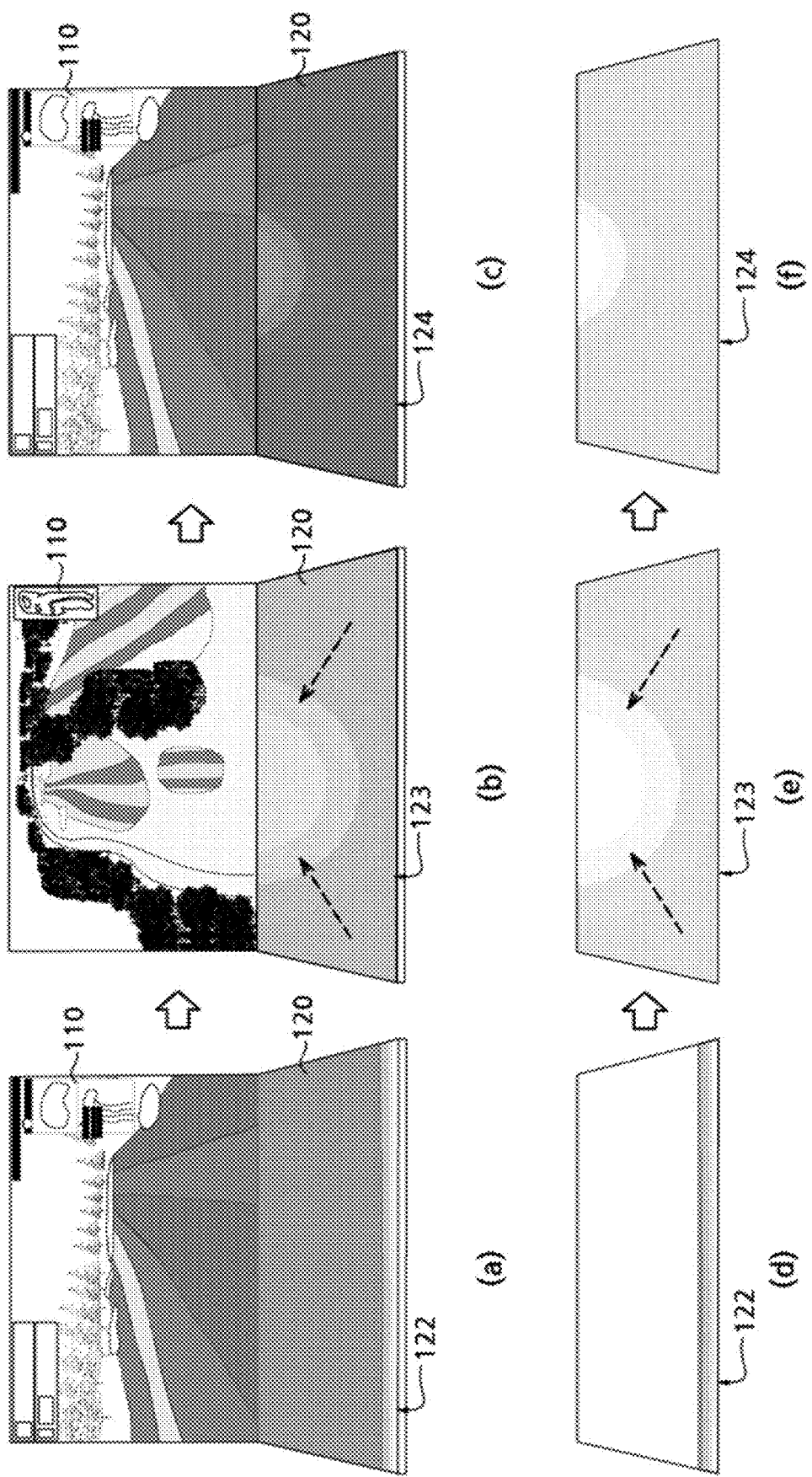

In addition to the case in which a special image preset for a predetermined situation is generated, as illustrated in FIG. 8, the virtual golf simulation apparatus according to the present invention may prepare various situations and a special image suitable for each of the situations in advance, and may generate a special image prepared in advance for a specific situation in the case in which the specific situation occurs.

In addition, various situations and a special image suitable for each of the situations may be prepared in advance before the user plays a golf game, and a special image preset for a special situation set by the user may be represented through the floor screen image while the user plays the golf game.

As is apparent from the above description, the virtual golf simulation apparatus and the method of realizing the image for virtual golf according to the present invention have advantages in that the virtual golf simulation apparatus, realizing images on the front screen and the floor screen in the user golf play space, changes the front screen image and the floor screen image when a specific situation occurs while the user plays golf using the front screen image and the floor screen image, whereby it is possible to provide the user who plays golf with greater realism and to provide the user who plays virtual golf with greater immersiveness or interest in the game.

INDUSTRIAL APPLICABILITY

A virtual golf simulation apparatus and a method of realizing an image for virtual golf according to the present invention are applicable to industries related to golf, in which a user may enjoy a round of virtual golf through golf simulation based on virtual reality.

The invention claimed is:

1. A virtual golf simulation apparatus comprising:
   a sensing device for generating sensing information of a golf ball hit by a user;
   an image output device for outputting a simulation image simulating a trajectory of a virtual ball on a virtual golf course to a front screen and a floor screen, wherein the front screen is provided in front of a location at which the user hits the golf ball, wherein the floor screen is provided on a floor between a shot plate, on which the user hits the golf ball and the front screen, wherein the simulation image includes a front screen image and a floor screen image; and
   a simulator comprising an image-processor for processing the simulation image to be output by the image output device and a controller for performing a calculation in order to simulate the trajectory of the virtual ball based on the sensing information sensed by the sensing device, performing detecting an occurrence of a predetermined situation before the user hits the golf ball on the shot plate, performing control such that the image-processor processes the simulation image is changed by shifting, and performing control such that the simulation image is output through the image output device, wherein
   the controller is configured to receive a result of sensing the golf ball from the sensing device and to determine whether the user is ready to hit the golf ball based on the result of the sensing of the golf ball or to determine whether a ball-ready indication indicating that the sensing device is ready to obtain the sensing information according to the hitting of the golf ball by the user is generated based on the result of the sensing of the golf ball, and
   upon determining that the user is ready to hit the golf ball or upon determining that the ball-ready indication is generated, the controller performing control such that the front screen image output to the front screen is shifted to the floor screen, whereby the virtual ball output to the front screen appears on the floor screen image or disappears from the floor screen image as a result of the shift.

2. The virtual golf simulation apparatus according to claim 1, wherein
   the image output device comprises a first image output device for outputting the front screen image and a second image output device for outputting the floor screen image, and
   the controller divides the simulation image generated by the image-processor into a first image corresponding to the front screen image to be output to the front screen, and a second image corresponding to the floor screen image to be output to the floor screen, and performs control such that the first image is output to the front screen through the first image output device and such that the second image is output to the floor screen through the second image output device.

3. The virtual golf simulation apparatus according to claim 1, wherein
   the sensing device is configured to sense whether the golf ball is placed on a shot mat provided on the shot plate and to sense whether the golf ball placed on the shot mat remains stationary for a predetermined amount of time, and
   the controller is configured to determine that the user is ready to hit the golf ball upon determining that the golf ball placed on the shot mat remains stationary for the predetermined amount of time based on a sensing result received from the sensing device.

4. The virtual golf simulation apparatus according to claim 1, wherein
   the sensing device detects position information of the golf ball on a shot mat provided on the shot plate and transmits the detected position information to the controller, and the controller performs control such that, when the ball-ready indication is generated, a shift direction and a shift distance of the image are calculated using the detected position information of the golf ball, whereby the image for the front screen is shifted to the floor screen based on the calculated shift direction and the calculated shift distance in order to locate the virtual ball output to the front screen at a detected position of the golf ball.

5. The virtual golf simulation apparatus according to claim 4, wherein
the sensing device generates the sensing information of the golf ball when the user hits the golf ball and transmits the sensing information to the controller, and
the controller performs control such that the simulation image in which the virtual ball corresponding to the golf ball is moved is output to the floor screen or both to the floor screen and to the front screen based on the location at which the golf ball is placed using the sensing information.

6. A method of realizing an image for virtual golf in which a part of the image is output to a front screen provided in front of a location at which a user hits a golf ball and the other part of the image is output to a floor screen provided on a floor between a shot plate on which the user hits the golf ball and the front screen, such that the image for the virtual golf played by the user is realized on the front screen and on the floor screen, the method comprising:
outputting the image for the virtual golf including a virtual golf course to the front screen and the floor screen, wherein a virtual ball corresponding to the golf ball on the virtual golf course is output to the front screen;
sensing whether the golf ball is placed on a shot mat provided on the shot plate by a sensing device configured to generate sensing information of the golf ball moved according to a hit by the user and transmitting a result of sensing whether the golf ball is placed on the shot mat to a controller before the user hits the golf ball;
determining, by the controller, whether the golf ball placed on the shot mat remains stationary for a predetermined amount of time based on the transmitted sensing result; and
controlling by the controller, such that the part of the image output to the front screen is shifted to the floor screen upon determining that the golf ball placed on the shot mat remains stationary for the predetermined amount of time, whereby the virtual ball output to the front screen appears on the image for the floor screen or disappears from the image for the floor screen as a result of the shift.

7. The method according to claim 6,
further comprising the controller generating a ball-ready indication indicating that the sensing device is ready to obtain the sensing information of the golf ball moved according to the hit by the user upon determining that the golf ball placed on the shot mat remains stationary for the predetermined amount of time.

8. The method according to claim 6,
wherein the step of controlling by the controller, such that the part of the image output to the front screen is shifted to the floor screen comprises:
detecting a position of the golf ball;
calculating a shift direction and a shift distance of the image from a position of the virtual ball to the detected position of the golf ball; and
controlling such that the image that is output to the front screen is shifted and output to the floor screen based on the calculated shift direction and the calculated shift distance.

9. A method of realizing an image for virtual golf including an image of a virtual green for putting of a user and a virtual ball corresponding to a golf ball on the virtual green, wherein a part of the image for the virtual golf is output to a front screen provided in front of a location at which the user putts the golf ball and the other part of the image for virtual the golf is output to a floor screen provided on a floor between a shot plate, on which the user putts and the front screen, such that the image for the virtual golf played by the user is realized on the front screen and on the floor screen, the method comprising:
outputting the image for the virtual golf including the virtual green to the front screen and the floor screen, wherein the virtual ball on the virtual green is output to the front screen;
sensing whether the golf ball is placed on a shot mat provided on the shot plate by a sensing device configured to generate sensing information of the golf ball moved according to a putt by the user and transmitting a result of sensing whether the golf ball is placed on the shot mat to a controller before the user putts the golf ball;
generating, by the controller, a ball-ready indication indicating that the sensing device is ready to perform sensing according to putting the golf ball by the user based on the transmitted sensing result; and
controlling by the controller, such that the part of the image output to the front screen is shifted to the floor screen when the ball-ready indication is generated, whereby the virtual ball output to the front screen appears on the image for the floor screen or disappears from the image for the floor screen as a result of the shift.

10. The method according to claim 9, wherein
the step of controlling by the controller, such that the part of the image output to the front screen is shifted to the floor screen comprises:
detecting a position of the golf ball;
calculating a shift direction and a shift distance of the image from a position of the virtual ball to the detected position of the golf ball; and
controlling such that the image that is output to the front screen is shifted to the floor screen based on the calculated shift direction and the calculated shift distance.

11. The method according to claim 10, further comprising:
displaying a guide line indicating a straight direction extending forwards from the virtual ball on the image, wherein
the step of controlling such that the image that is output to the front screen is shifted to the floor screen comprises:
controlling such that the virtual ball disappears from the image as the image is shifted and such that the guide line is output to the floor screen straightly in a forward direction based on a location at which the golf ball is placed.

12. The method according to claim 10, wherein
the controller is configured to calculate a putting guide line for guiding a putting direction from the virtual ball to a hole cup on the virtual green based on information about a topography between the virtual ball and the hole cup, and the step of controlling such that the image is output to the front screen is shifted to the floor screen comprises:

controlling such that the virtual ball disappears from the image as the image is shifted and such that the putting guide line is output to the floor screen based on a location at which the golf ball is placed.

13. The method according to claim 10, further comprising:

generating, by the sensing device, sensing information of the golf ball hit by the user and transmitting the generated sensing information to the controller; and controlling such that the image simulating a trajectory of the virtual ball is output to the floor screen or both to the floor screen and to the front screen based on a location at which the golf ball is placed using the generated sensing information.

* * * * *